(12) United States Patent
Lirette et al.

(10) Patent No.: US 9,556,994 B2
(45) Date of Patent: Jan. 31, 2017

(54) WRAP-AROUND BAND AND SLEEVE ATTACHMENT APPARATUS FOR AN OILFIELD TUBULAR

(71) Applicant: Antelope Oil Tool & Mfg. Co., LLC, Mineral Wells, TX (US)

(72) Inventors: Brent James Lirette, Cypress, TX (US); Michael Lynn Betik, Tomball, TX (US); Jean Buytaert, Mineral Wells, TX (US); Clayton Plucheck, Tomball, TX (US); Ira Eugene Hining, Houston, TX (US)

(73) Assignee: ANTELOPE OIL TOOL & MFG. CO., Mineral Wells, TX (US)

( * ) Notice: Subject to any disclaimer, the term of this patent is extended or adjusted under 35 U.S.C. 154(b) by 124 days.

(21) Appl. No.: 14/461,297

(22) Filed: Aug. 15, 2014

(65) Prior Publication Data

US 2014/0352980 A1    Dec. 4, 2014

Related U.S. Application Data

(63) Continuation-in-part of application No. 12/756,177, filed on Apr. 8, 2010, now Pat. No. 8,832,906.

(Continued)

(51) Int. Cl.
*E21B 41/00* (2006.01)
*F16L 55/00* (2006.01)
(Continued)

(52) U.S. Cl.
CPC ............... *F16L 55/00* (2013.01); *B25B 27/10* (2013.01); *E21B 17/00* (2013.01); *E21B 17/006* (2013.01);
(Continued)

(58) Field of Classification Search
CPC ........ B25B 27/10; E21B 17/00; E21B 17/006; E21B 19/00; F16D 1/0858; F16L 55/00; Y10T 403/54
(Continued)

(56) References Cited

U.S. PATENT DOCUMENTS 1,201,706 A   10/1916  Dodge
2,368,401 A    1/1945  Baker
(Continued)

FOREIGN PATENT DOCUMENTS

EP    0079702       5/1983
EP    0088507 A1    9/1983
(Continued)

OTHER PUBLICATIONS

International Search Report and Written Opinion dated Nov. 26, 2014 from International Application No. PCT/US2014/051358, pp. 1-9.
(Continued)

*Primary Examiner* — Robert J Sandy
*Assistant Examiner* — David Upchurch
(74) *Attorney, Agent, or Firm* — MH2 Technology Law Group, LLP

(57) ABSTRACT

An attachment apparatus for attaching to a tubular. The apparatus may include a flexible member extending circumferentially around the tubular more than once. A tension force on the flexible member may cause the flexible member to apply a first radially-inward gripping force on the tubular. An annular sleeve may be positioned radially-outward from the flexible member. The sleeve may apply a second radially-inward gripping force on the flexible member and the tubular.

16 Claims, 7 Drawing Sheets

Related U.S. Application Data

(60) Provisional application No. 61/287,665, filed on Dec. 17, 2009, provisional application No. 61/237,202, filed on Aug. 26, 2009, provisional application No. 61/221,716, filed on Jun. 30, 2009, provisional application No. 61/867,023, filed on Aug. 17, 2013.

(51) Int. Cl.
   *E21B 19/00* (2006.01)
   *B25B 27/10* (2006.01)
   *E21B 17/00* (2006.01)
   *F16D 1/08* (2006.01)

(52) U.S. Cl.
   CPC ............ *E21B 19/00* (2013.01); *F16D 1/0858* (2013.01); *Y10T 403/54* (2015.01)

(58) Field of Classification Search
   USPC .......................... 24/20 R; 166/380; 403/291
   See application file for complete search history.

(56) References Cited

U.S. PATENT DOCUMENTS

| | | | |
|---|---|---|---|
| 2,496,402 A | 2/1950 | McVeigh et al. | |
| 2,797,756 A | 7/1957 | Hall, Sr. | |
| 2,824,613 A | 2/1958 | Baker et al. | |
| 3,040,405 A | 6/1958 | Solum | |
| 2,855,052 A | 10/1958 | Wright et al. | |
| 2,962,313 A | 11/1960 | Conrad | |
| 2,986,417 A | 5/1961 | Baker | |
| 3,063,760 A | 11/1962 | Gifford | |
| 3,124,196 A | 3/1964 | Solum | |
| 3,292,708 A | 12/1966 | Mundt | |
| 3,360,846 A | 1/1968 | Schellstede et al. | |
| 3,563,575 A | 2/1971 | Sanford | |
| 3,566,965 A | 3/1971 | Solum | |
| 3,652,138 A | 3/1972 | Collett | |
| 3,916,998 A | 11/1975 | Bass, Jr. et al. | |
| 4,146,060 A | 3/1979 | Garrett | |
| 4,363,360 A | 12/1982 | Richey | |
| 4,367,053 A | 1/1983 | Stratienko et al. | |
| 4,434,125 A | 2/1984 | Lavender et al. | |
| 4,531,582 A | 7/1985 | Muse et al. | |
| 4,651,823 A | 3/1987 | Spikes | |
| 5,501,281 A | 3/1996 | White et al. | |
| 5,517,878 A | 5/1996 | Klein et al. | |
| 5,520,422 A | 5/1996 | Friedrich et al. | |
| 5,698,055 A | 12/1997 | Benkoczy | |
| 5,706,894 A | 1/1998 | Hawkins, III | |
| 5,743,302 A | 4/1998 | McNeely | |
| 5,817,952 A | 10/1998 | Swisher et al. | |
| 5,860,760 A | 1/1999 | Kirk | |
| 5,908,072 A | 6/1999 | Hawkins | |
| 6,361,243 B1 | 3/2002 | Geib | |
| 6,484,803 B1 | 11/2002 | Gremillion | |
| 6,679,325 B2 | 1/2004 | Buytaert | |
| 6,679,335 B2 | 1/2004 | Slack et al. | |
| 6,957,704 B2 | 10/2005 | Rogers et al. | |
| 7,159,619 B2 | 1/2007 | Latiolais, Jr. et al. | |
| 8,146,662 B2 * | 4/2012 | Shoemate | E21B 43/084 166/233 |
| 8,251,138 B2 * | 8/2012 | Bonner | E21B 43/084 166/230 |
| 8,291,971 B2 * | 10/2012 | Lopez | E21B 43/088 166/227 |
| 2001/0040041 A1 | 11/2001 | Pennington et al. | |
| 2002/0139537 A1 | 10/2002 | Young et al. | |
| 2003/0019637 A1 | 1/2003 | Slack et al. | |
| 2008/0156488 A1 | 7/2008 | Thornton | |
| 2009/0229823 A1 | 9/2009 | Moen et al. | |
| 2009/0255666 A1 | 10/2009 | Olsen et al. | |
| 2009/0308615 A1 | 12/2009 | Buytaert | |
| 2010/0326671 A1 | 12/2010 | Buytaert et al. | |
| 2012/0006533 A1 | 1/2012 | Barnard et al. | |
| 2012/0073803 A1 | 3/2012 | Dalmia | |
| 2012/0227959 A1 | 9/2012 | Buytaert et al. | |

FOREIGN PATENT DOCUMENTS

| | | |
|---|---|---|
| GB | 2304753 A | 3/1997 |
| WO | 2007143324 A1 | 12/2007 |

OTHER PUBLICATIONS

Patrizia Lindquist (Authorized Officer), PCT Invitation to Pay Additional Fees dated Oct. 20, 2010, PCT Application No. PCT/US2010/037441, filed Jun. 4, 2010, pp. 1-6.

Patrizia Lindquist (Authorized Officer), PCT International Search Report and Written Opinion dated Dec. 23, 2010, PCT Application No. PCT/US20101037441, filed Jun. 4, 2010, pp. 1-16.

Author Unknown, Frank's Anaconda Stop Collar Sheet, Frank's Casing Crew & Rental Tools, Inc., Lafayette, LA, 2003, 1 page.

Non-Final Office Action dated Sep. 13, 2012, U.S. Appl. No. 12/756,177, filed Apr. 8, 2010, pp. 1-9.

Final Office Action dated Feb. 1, 2013, U.S. Appl. No. 12/756,177, filed Apr. 8, 2010, pp. 1-12.

Non-Final Office Action dated Aug. 14, 2013, U.S. Appl. No. 12/756,177, filed Apr. 8, 2010, pp. 1-11.

Final Office Action dated Mar. 13, 2014, U.S. Appl. No. 12/756,177, filed Apr. 9, 2010, pp. 1-11.

Jean Buytaert et al., "Wrap-Around Stop Collar and Method of Forming", U.S. Appl. No. 14/461,273, filed Aug. 15, 2014.

Jean Buytaert et al., "Multi-Vane Centralizer and Method of Forming", U.S. Appl. No. 14/461,282, filed Aug. 15, 2014.

Jean Buytaert et al., "Wrap-Around Band Tool Connector and Method of Forming", U.S. Appl. No. 14/461,292, filed Aug. 15, 2014.

International Search Report and Written Opinion dated Nov. 20, 2014 from International Application No. PCT/US2014/051364, pp. 1-16.

* cited by examiner

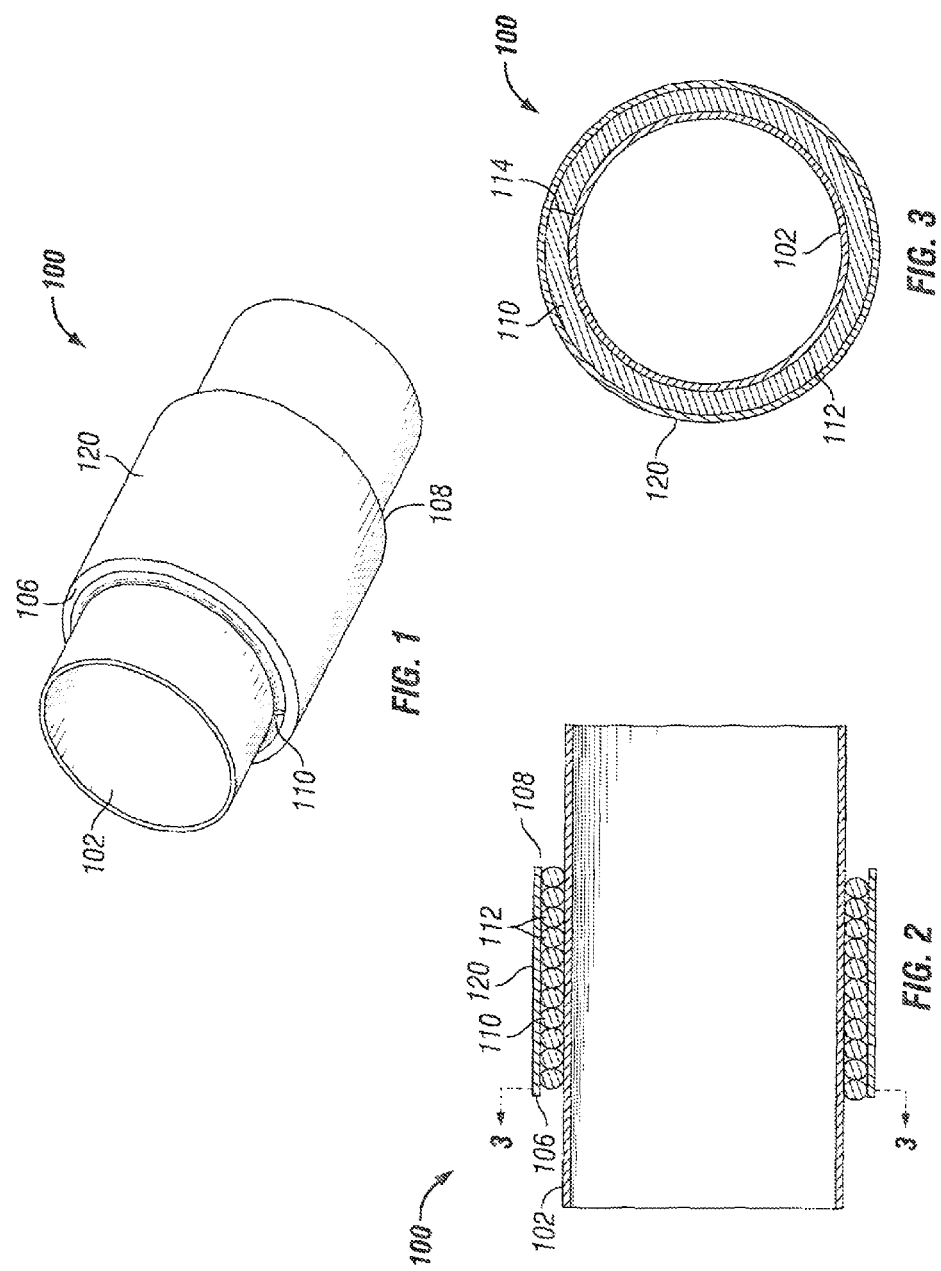

WRAP-AROUND BAND AND SLEEVE ATTACHMENT APPARATUS FOR AN OILFIELD TUBULAR

CROSS-REFERENCE TO RELATED APPLICATIONS

This application is a continuation-in-part of U.S. Patent Application having Ser. No. 12/756,177, which was filed on Apr. 8, 2010, and which claims priority to U.S. Provisional Patent Application having Ser. No. 61/287,665, filed on Dec. 17, 2009, U.S. Provisional Patent Application having Ser. No. 61/237,202, filed on Aug. 26, 2009, and U.S. Provisional Patent Application having Ser. No. 61/221,716, filed on Jun. 30, 2009. This application also claims priority to U.S. Provisional Patent Application having Ser. No. 61/867,023, which was filed on Aug. 17, 2013. The entirety of these applications is incorporated herein by reference.

BACKGROUND

Oilfield tubulars, such as pipes, drill strings, casing, tubing, etc., may be used to transport fluids or to produce water, oil, and/or gas from geologic formations through wellbores. In various applications, a shoulder may be formed on an exterior of the tubular, e.g., for gripping the tubular and/or for connecting tools, such as centralizers, scrapers, cement baskets, etc, to the exterior of the tubular.

A variety of structures are employed to provide such shoulders. In some cases, integral pans of the tubular itself, such as expanded diameter sections, e.g., pipe joints at an end of the tubular, may be employed as the shoulder. In other cases, especially when a shoulder is needed between the ends of the tubular, a separate stop collar is generally fixed in position around the tubular to provide the shoulder. Such stop collars generally include a metal ring, which is either slid over an end of the tubular or hinged so as to receive the tubular laterally.

To fix the position of the stop collar on the tubular, the stop collars generally employ a gripping feature that engages the tubular. Such gripping features often include adhesives and/or marking structures, such as teeth or set screws. However, for some tubulars and/or applications thereof, marking the tubular may not be appropriate, either because marking the tubular damages the tubular or is otherwise incompatible with the application, or because the tubular may be too hard for marking structures to adequately bite into the tubular, resulting in inadequate holding forces. Adhesives, although suitable in a variety of stop collar applications, may lack sufficient durability or bonding strength to alone provide sufficient holding force.

In other situations, a tool may be connected directly to a tubular, such that it is movable or fixed in position relative to the tubular. Such tools may be connected to the tubular in generally the same way as a stop collar is attached to the tubular. Accordingly, gripping the tubular in the context of tool-attachment may be subject to the same or similar challenges as experienced in gripping the tubular in the context of a stop collar.

SUMMARY

Embodiments of the disclosure may provide an apparatus including a flexible member extending circumferentially around a tubular more than once. A tension force on the flexible member may cause the flexible member to apply a first radially-inward gripping force on the tubular. An annular sleeve may be positioned radially-outward from the flexible member. The sleeve may apply a second radially-inward gripping force on the flexible member and the tubular.

Embodiments of the disclosure may also provide an attachment apparatus for attaching to a tubular. The apparatus may include a flexible member positioned circumferentially around the tubular such that the flexible member defines a plurality of turns in a helical configuration around the tubular. A tension force on the flexible member may cause the flexible member to apply a first radially-inward gripping force on the tubular. An annular sleeve may be positioned radially-outward from the flexible member. The sleeve may apply a second radially-inward gripping force on the flexible member and the tubular, and an inner surface of the sleeve may form an interference fit with an outer surface of the flexible member.

Embodiments of the disclosure may further provide a method for forming an attachment apparatus on a tubular. The method may include positioning a flexible member around an outer surface of the tubular. The flexible member may include a plurality of turns in a helical configuration. A tension force may be applied to the flexible member, and the tension force may cause the flexible member to apply a radially-inward gripping force on the tubular. An annular sleeve may be positioned around the outer surface of the tubular. The annular sleeve may be moved axially with respect to the tubular until the sleeve is at least partially around the flexible member.

BRIEF DESCRIPTION OF THE DRAWINGS

The invention may best be understood by referring to the following description and accompanying drawings that are used to illustrate embodiments of the invention. In the drawings:

FIG. 1 illustrates a perspective view of an attachment apparatus installed on a tubular, according to an embodiment.

FIG. 2 illustrates a side, cross-sectional view of the attachment apparatus of FIG. 1 installed on the tubular, according to an embodiment.

FIG. 3 illustrates an end view, taken along line 3-3 in FIG. 2, of the attachment apparatus in FIGS. 1 and 2, according to an embodiment.

DETAILED DESCRIPTION

Figure 4:
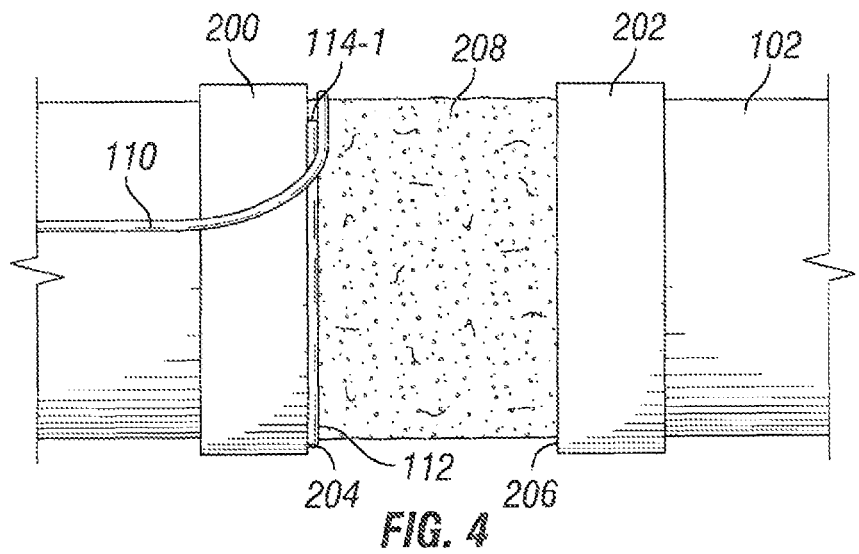
FIGS. 4-6 illustrate side views of an installation of a flexible member onto the tubular to form a portion of the attachment apparatus, according to an embodiment.

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the embodiments presented below may be combined in any combination of ways, e.g., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to," All numerical values in this disclosure may be exact or approximate values unless otherwise specifically stated. Accordingly, various embodiments of the disclosure may deviate from the numbers, values, and ranges disclosed herein without departing from the intended scope. In addition, unless otherwise provided herein, "or" statements are intended to be non-exclusive; for example, the statement "A or B" should be considered to mean "A, B, or both A and B."

FIGS. 1 and 2 illustrate a perspective view and a side, cross-sectional view, respectively, of an attachment apparatus 100 installed on an oilfield tubular 102, according to an embodiment. The attachment apparatus 100 may be, include, or be a part of, a stop collar or a collar, such as an end collar, of a tool that is to be attached to a tubular. In other embodiments, the attachment apparatus 100 may be any other type of collar or structure that is able to be attached to a tubular. As the term is used herein, an "oilfield tubular" includes a pipe, tubular, tubular member, casing, liner, tubing, drill pipe, drill string, a bar, a rod, a structural member and other like terms. Such oilfield tubulars may be or include one or more segments, which may be connected or "made-up" together to form a stand or string; accordingly, an "oilfield tubular" may refer to a joint or segment of a tubular member, or a stand or string of multiple tubular members joined together. As used herein, "axial" and "axially" refer to a direction that is parallel to a central or longitudinal axis of the tubular 102; "radial" and "radially" refer to a direction perpendicular to the axial direction.

Referring now specifically to FIG. 1, the attachment apparatus 100 may include a flexible member 110 and an annular sleeve 120 positioned radially-outward from the flexible member 110, which may individually or together apply a radially inward gripping force on the tubular 102. The attachment apparatus 100 may have two axial ends 106, 108, which may, in at least one embodiment, be at least partially defined by the flexible member 110 and/or the sleeve 120, as shown. One or both of the axial ends 106, 108 may extend straight in a radial direction from the tubular 102 and/or may be tapered, beveled, rounded, or otherwise shaped.

Referring now specifically to FIG. 2, the flexible member 110 may be disposed radially-between the tubular 102 and at least a portion of the sleeve 120. The flexible member 110 may be an elongate member, and may be or include a monolithic or braided cable, wire, ribbon, string, cord, line, rope, band, tape, coil spring, multi-strand wire, wire rope or any member having the flexibility and strength to be wrapped about the outer surface of the tubular 102. For example, the flexible member 110 may constructed from a metal, plastic, composite, or any combination thereof in one embodiment, the flexible member 110 includes a steel cable (e.g., a stainless steel cable). Further, the flexible member 110 may be one unitary length of material, e.g., a length providing a desired holding force once it is wrapped (and/or adhered) on the tubular 102. In other embodiments, the flexible member 110 may include multiple segments that are attached together (e.g., end-on-end).

The flexible member 110 may be wrapped more than once (e.g., one 360 degree turn plus any fraction of a subsequent turn) circumferentially around the tubular 102. The flexible member 110 may apply a radially-inward gripping force on the tubular 102. For example, the flexible member 110 may be wrapped helically around the tubular 102, with the gripping force being generated by applying a tension on the flexible member 110 during such helical wrapping.

In another embodiment, the flexible member 110 may be heated before, during, or after being wrapped around the tubular 102 to or near to a red-hot transition temperature, which may cause the flexible member 110 to shrink, resulting in a tension force in the flexible member 110 that causes the flexible member 110 to apply a radially-inward gripping force on the tubular 102. Thereafter, the flexible member 110 may be cooled such that the flexible member 110 retains its shrunken length, thereby maintaining the radially-inward gripping force.

In yet another embodiment, the flexible member 110 may be a helical spring. The flexible member 110 (e.g., the spring) may have a "natural" configuration with a first diameter, which is the diameter of the flexible member 110 when no external force is applied. The first diameter may be less than or equal to the diameter of the tubular 102. The flexible member 110 may also define a certain number of turns 112 in the natural configuration. Prior to installing the flexible member 110 onto the tubular 102, a torque force may be applied to the flexible member 110 (e.g., to the ends 114 thereof). The torque force may cause the flexible member 110 to transition to an expanded configuration having a second diameter that is larger than the first diameter. Such torque may also create spaces between the turns 112, which may cause the length of the flexible member 110 to increase.

The flexible member 110 in the expanded configuration may be received over the tubular 102. Upon reaching a desired installation location, the torque force may be removed, causing the flexible member 110 to contract back toward the natural configuration. In another embodiment, a temporary adhesive may be employed to retain the flexible member 110 in the expanded configuration for a duration, before breaking down and allowing the flexible member 110 to contract. Full contraction to the first diameter may be prevented by the flexible member 110 bearing on the tubular 102, and thus the flexible member 102 may apply a radially-inward gripping force on the tubular 102.

In a helically-wrapped embodiment, the flexible member 110 may define turns 112 (e.g., 360 degree increments) around the tubular 102. Successive turns 112 may be adjacent to one another, generally in an axial direction along the tubular 102. In one, some, or all of the turns 112, the flexible member 110 may abut the flexible member 110 contained in at least one adjacent turn 112. As such, the flexible member 110 may form a generally continuous surface that is spaced radially apart from the tubular 102.

The sleeve 120 may be positioned at least partially around the exterior of the flexible member 110. In this position, the sleeve 120 may protect the flexible member 110 in the downhole environment. In some embodiments, the sleeve 120 may be long enough such that it extends axially past the first and last turns 112, so as to form the ends 106, 108.

The sleeve 120 may be or include an annular body made of plastic, elastomer, composite, metal, or a combination thereof. The sleeve 120 may provide a radially-inward gripping force on the flexible member 110 and the tubular 102, and may be fixed thereto in an interference fit. For example, the inner surface of the sleeve 120 may expand as it is received around the flexible member 110. The elasticity of the sleeve 120 may cause the sleeve 120 to apply the radially-inward gripping force on the flexible member 110, thereby producing the interference fit between the sleeve 120 and the flexible member 110. The radially-inward gripping force may be transmitted through the flexible member 110 to the tubular 102. The radially-inward yipping force may allow the attachment apparatus 100 to generate high friction forces, which may, in at least some embodiments, resist axial and/or circumferential movement with respect to the tubular 102.

FIG. 3 illustrates an axial end view of the attachment apparatus 100, according to an embodiment, e.g., as taken along lines 3-3 of FIG. 2. As shown, the flexible member 110 may include ends 114 (e.g., one at the beginning of the first turn 112 proximal the first end 106). It will be appreciated that an axial view of the flexible member 110 proximal the second end 108 may be substantially similar, also providing a circumferential end where the flexible member 110 terminates. The ends 114 may be cut at angles, such that the ends 114 taper, and thereby provide a generally flush or gradual change in the end surface for the flexible member 110.

Figure 5:
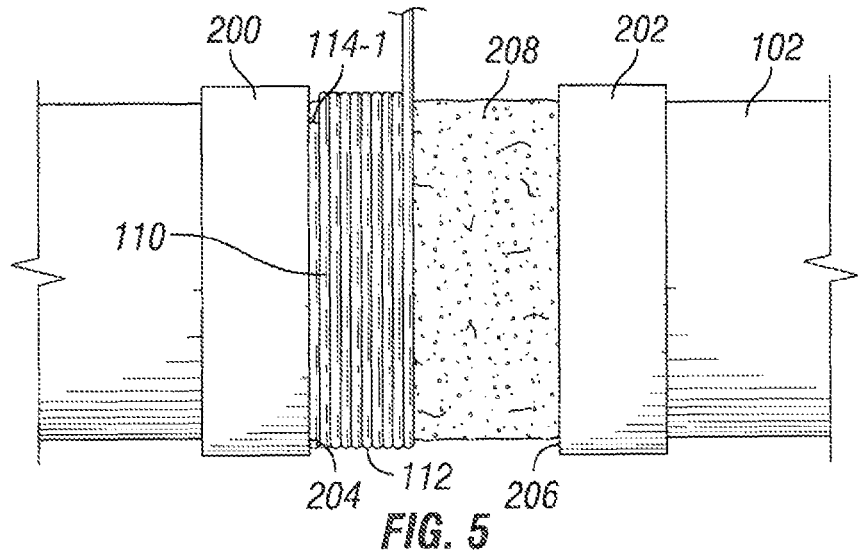
Figure 6:
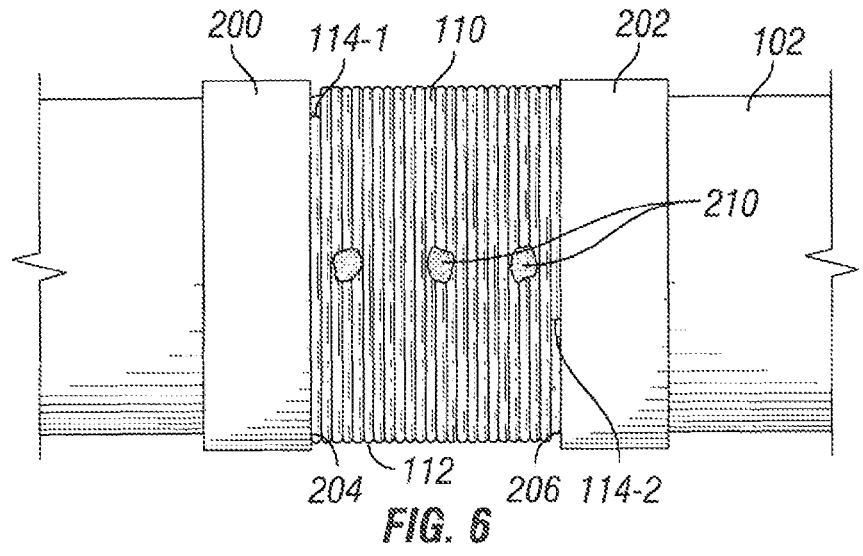

FIGS. 4-6 illustrate a sequence of the flexible member 110 being positioned around the tubular 102, according to an embodiment. Beginning with FIG. 4, installation collars 200, 202 may be positioned on the tubular 102 and spaced axially apart, e.g., such that the inboard sides 204, 206 of the collars 200, 202, respectively, are positioned generally where the ends 106, 108 (FIGS. 1 and 2) of the attachment apparatus 100 will be positioned. In some embodiments, such installation collars 200, 202 may be omitted from use during installation. In an embodiment, the installation collars 200, 202 may be each be provided by a unitary ring that may be slid over an end of the tubular 102. In another embodiment, the installation collars 200, 202 may be provided by a unitary ring that is flexible and includes an axially-extending gap, such that two circumferential ends are defined. In such an embodiment, the installation collars 200, 202 may be flexed so as to receive the tubular 102 laterally. In another embodiment, the installation collars 200, 202 may be provided by two or more arcuate sections that are connected together (e.g., hinged, clamped, fastened, etc.). It will be appreciated that in some embodiments, one of the installation collars 200 may be provided by one of the embodiments just described, while the other one of the installation collars 202 may be provided according to another embodiment.

Further, a layer 208 may be applied to the outer surface of the tubular 102 (e.g., at least partially between the inboard sides 204, 206 of the collars 200, 202). The layer 208 may be or include an adhesive, such as an epoxy, glue, resin, polyurethane, cyanoacrylate, acrylic polymer, hot melt adhesive, contact adhesive, reactive adhesive, light curing adhesive, low temperature metal spray, metal spray (such as WEARSOX® commercially available from Antelope Oil Tool & Mfg. Co., Houston, Tex.), combinations thereof, and/or the like. The layer 208 may be employed to increase the holding force provided by the attachment apparatus 100, avoid the flexible member 110 biting into the tubular 102, and/or the like. The layer 208 may coat the tubular 102 entirely between the installation collars 200, 202 or, in other embodiments, may include axially and/or circumferentially-extending gaps.

Before or after the layer 208 is cured (e.g., when using an adhesive for the layer 208), a first tam 112 of the flexible member 110 may be disposed around the tubular 102, between the installation collars 200, 202 (e.g., proximal to the installation collar 200, and on the layer 208). The first turn 112 may include the end 114-1 of the flexible member 110. Further, the end 114-1 may be secured in place, such that it is generally stationary relative to the tubular 102 during installation. For example, the end 114-1 may be held in place, with tension applied to the flexible member 110, and the end 114-1 welded to a second turn 112 of the flexible member 110. In other embodiments, the flexible member 110 may be adhered to itself near the end 114-1, clamped or fastened to itself, or the like, in other embodiments, the end 114-1 of the flexible member 110 may be secured to the installation collar 200, which may be secured against rotation. In other embodiments, a section of the flexible member 110 proximal to the end 114-1 may be turned, e.g., toward an axial direction, and held temporarily in place while one or more additional turns 112 of the flexible member 110 are received over the end 114-1.

Referring now specifically to FIG. 5, the flexible member 110 may be helically wrapped around the tubular 102 to form successive turns 112. In an embodiment, the tubular 102 may be turned while the flexible member 110 is fed laterally onto the tubular 102 (e.g., from a spool). A friction or resistance (e.g., as applied by the spool of the flexible member 110 resisting the extension of the flexible member 110) may apply tension to the flexible member 110, causing the flexible member 110 to apply a radially-inwardly directed gripping force on the tubular 102. Thus, the gripping force supplied by the flexible member 110 may provide the holding force for the attachment apparatus 100, once installed. In another embodiment, the tubular 102 may remain stationary while the flexible member 110 is wrapped therearound. In yet another embodiment, the tubular 102 may rotate and the flexible member 110 may be moved around the tubular 102 (e.g., such that both components are in motion during the installation process). As shown, the successive turns 112 may abut against one another; however, in other embodiments, two or more of the adjacent turns 112 may be spaced apart, such that they do not abut.

In some embodiments, applying the layer 208 and wrapping the flexible member 110 may be an iterative process. For example, a certain width (e.g., less than the distance between the installation collars 200, 202) of the layer 208 may be applied onto the tubular 102, and then the flexible member 110 may be wrapped over that width of the layer 208. Then, another width of the layer 208 may be applied, and then flexible member 110 wrapped over that width. This process may repeat one or more times. In other embodiments, the layer 208 may be applied to the extent needed (e.g., all or a portion of the width between the installation collars 200, 202), and then the flexible member 110 may be wrapped around the tubular 102 continuously.

As shown in FIG. 6, the helical wrapping of the flexible member 110 around the tubular 102 may continue (e.g., until the flexible member 110 abuts both of the installation collars 200, 202). In some embodiments, the wrapping of the flexible member 110 ends prior to the flexible member 110 spanning the entire distance between the installation collars 200, 202.

In addition, in at least some embodiments, two or more adjacent turns 112 may be welded, adhered, or otherwise secured together. For example, as shown, several welds 210 may be created, attaching together the turns 112. Such welding (and/or otherwise attaching) together the turns 112 may further serve to retain the position of the flexible member 110.

Once the flexible member 110 is in place, the installation collars 200, 202 may be removed from the tubular 102. The installation collars 200, 202 may be removed by sliding the installation collars 200, 202 over opposite ends of the tubular 102 or by removing one or more of the installation collars 200, 202 laterally (e.g., when the collars 200, 202 include a hinge).

Although not shown, in at least one embodiment, a layer of adhesive, spray metal, or the like may be applied over the flexible member 110 once the flexible member 110 is wrapped around the tubular 102. The layer may be made of the same materials as the layer 208 described above, or the layer may be made of different materials.

Figure 7:
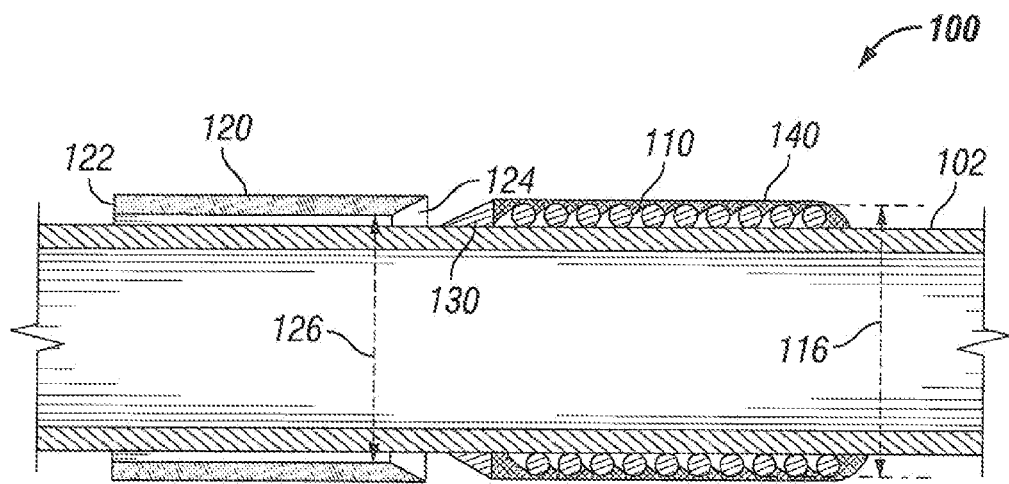
FIGS. 7 and 8 illustrate a first sequence of the sleeve being installed around the tubular and the flexible member, according to an embodiment.
Figure 8:
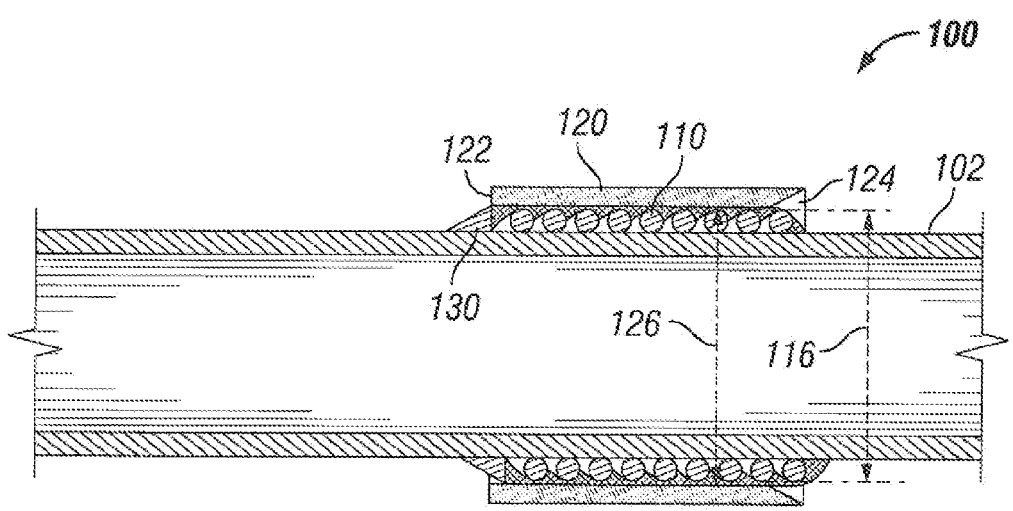

FIGS. 7 and 8 illustrate a first sequence of the sleeve 120 being installed around the tubular 102, according to an embodiment. More particularly, FIG. 7 illustrates a side, cross sectional view of the sleeve 120 around the tubular 102 and axially-offset from the flexible member 110, according to an embodiment. The sleeve 120 may be positioned around the tubular 102. The sleeve 120 may be positioned around the tubular 102 by sliding the sleeve 120 over an end of the tubular and toward the flexible member 110 (e.g., to the right, as shown in FIG. 7). In another embodiment, the sleeve 120 may be moved laterally into position amend the tubular 102 (e.g., when the sleeve 120 includes a hinge). Before the sleeve 120 contacts the flexible member 110, a diameter 126 of the inner surface of the sleeve 120 may be less than or equal to a diameter 116 of the outer surface of the flexible member 110 (see FIG. 7).

FIG. 8 illustrates a side, cross-sectional view of the sleeve 120 around the tubular 102 and axially-aligned with the flexible member 110, according to an embodiment. The sleeve 120 may be moved or slid toward the flexible member 110 (e.g., to the right, as shown in FIG. 8). For example, the sleeve 120 may be moved by pushing or hitting a first axial end 122 of the sleeve 120.

As shown, in at least one embodiment, a second, opposing axial end 124 of the sleeve 120 may be tapered. The tapered axial end 124 may allow the inner surface of the sleeve 120 to ride onto the flexible member 110. As the sleeve 120 continues to move onto the outer surface of the flexible member 110, the sleeve 120 may be expanded radially-outwards. As such, the diameter 126 of the inner surface of the sleeve 120 may become greater than or equal to the diameter 116 of the outer surface of the flexible member 110 when the sleeve 120 is positioned around the flexible member 110. When positioned around the flexible member 110, the elasticity of the sleeve 120 may cause the sleeve 120 to apply a radially-inward force on the flexible member 110, e.g., to form an interference fit between the sleeve 120 and the flexible member 110.

Further, the sleeve 120 may have an axial dimension that is smaller than, equal to, or greater than the axial dimension of the flexible member 110. In an embodiment in which the sleeve 120 is axially-longer than the flexible member 110, the sleeve 120 may be fully received onto the flexible member 110 and have an unexpanded, "bullet nose" area that extends past (e.g., to the left, as shown in FIG. 8) the flexible member 110.

In addition to or in lieu of the tapered end 124, the attachment apparatus 100 may include an optional ramp 130 positioned axially-adjacent to the flexible member 110 on the outer surface of the tubular 102. In other embodiments, the ramp 130 may be omitted. The ramp 130 may include a tapered surface that may facilitate a more gradual expansion of the diameter 126 of the sleeve 120 as the sleeve 120 moves onto the outer surface of the flexible member 110. When used together, the tapered end 124 of the sleeve 122 may contact and slide along the ramp 130. The sleeve 120 may then continue to move axially until the sleeve 120 at least partially surrounds the flexible member 110. As shown, the sleeve 120 may surround all of the turns 112 of the flexible member 110. The inner surface of the sleeve 120 may be substantially smooth to facilitate movement of the sleeve 120 with respect to the flexible member 110.

In at least one embodiment, the flexible member 110 may receive an optional coating 140, e.g., prior to receiving the sleeve 120. In at least one embodiment, the coating 140 may be an adhesive that forms a bond between the flexible member 110 and the sleeve 120, so as to resist displacement of the sleeve 120 relative to the flexible member 110. In addition, the adhesive may reduce a friction between the sleeve 120 and the flexible member 110 when sliding the sleeve 120 over the flexible member 110 during installation. Further, the adhesive may be used to form a ramp surface similar to the ramp 130. In some embodiments, the coating 140 may be omitted.

Figure 9:
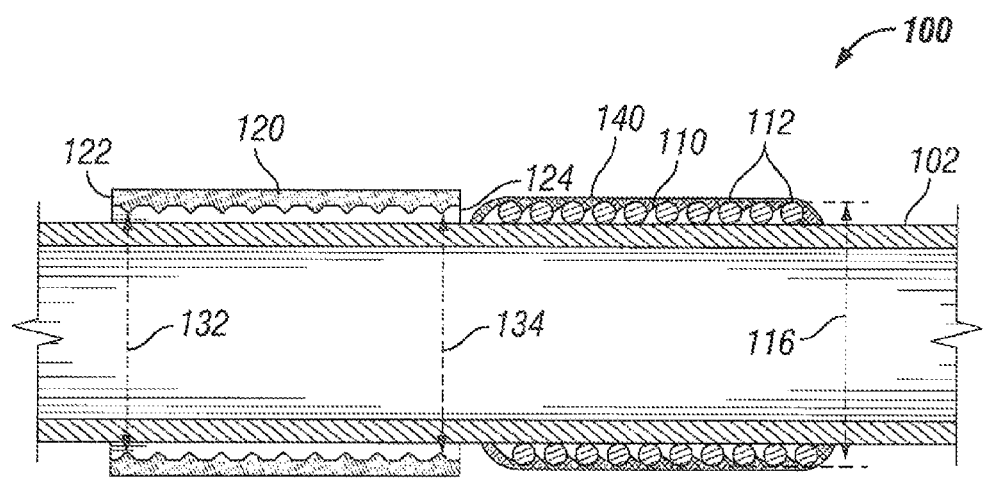
FIGS. 9 and 10 illustrate a second sequence of the sleeve being installed around the tubular and the flexible member, according to an embodiment.
Figure 10:
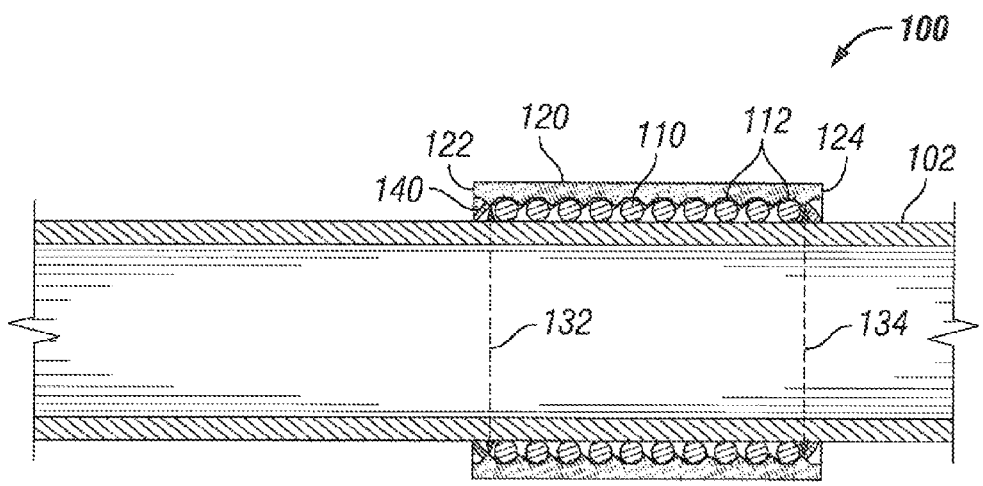

FIGS. 9 and 10 illustrate a second sequence of the sleeve 120 being installed around the tubular 102 and the flexible member 110, according to an embodiment. More particularly, FIG. 9 illustrates a side, cross-sectional view of the sleeve 120 around the tubular 102 and axially-offset from the flexible member 110, according to an embodiment. The sleeve 120 may be positioned around the tubular 102, as described above. As shown in FIG. 9, the inner surface 128 of the sleeve 120 may include ridges or teeth. For example, the inner surface 128 of the sleeve 120 include helical threads. A diameter 132 of the inner surface 128 of the sleeve 120 proximate to the first axial end 122 may be substantially equal to a diameter 134 of the inner surface 128 of the sleeve 120 proximate to the second axial end 124.

FIG. 10 illustrates a side, cross-sectional view of the sleeve 120 around the tubular 102 and axially-aligned with the flexible member 110, according to an embodiment. The sleeve 120 may be moved or slid toward the flexible member 110 (e.g., to the right, as shown in FIG. 10). Upon contacting the flexible member 110, the sleeve 120 may be rotated with respect to the flexible member 110 such that the threaded inner surface 128 of the sleeve 120 engages the turns 112 of the flexible member 110. Thus, the turns 112 of the flexible member 110 may serve as threads on the outer surface of the tubular 102. Rotation of the sleeve 120 may allow the sleeve 120 to continue advancing in the axial direction.

In at least one embodiment, the flexible member 110 may receive the coating 140, e.g., prior to receiving the sleeve 120. As noted above, the coating 140 may be an adhesive that forms a bond between the flexible member 110 and the sleeve 120, so as to resist displacement of the sleeve 120 relative to the flexible member 110. In addition, the adhesive may reduce a friction between the sleeve 120 and the flexible member 110 when sliding the sleeve 120 over the flexible member 110 during installation. Further, the adhesive may be used to form a ramp surface similar to the ramp 130.

Figure 11:
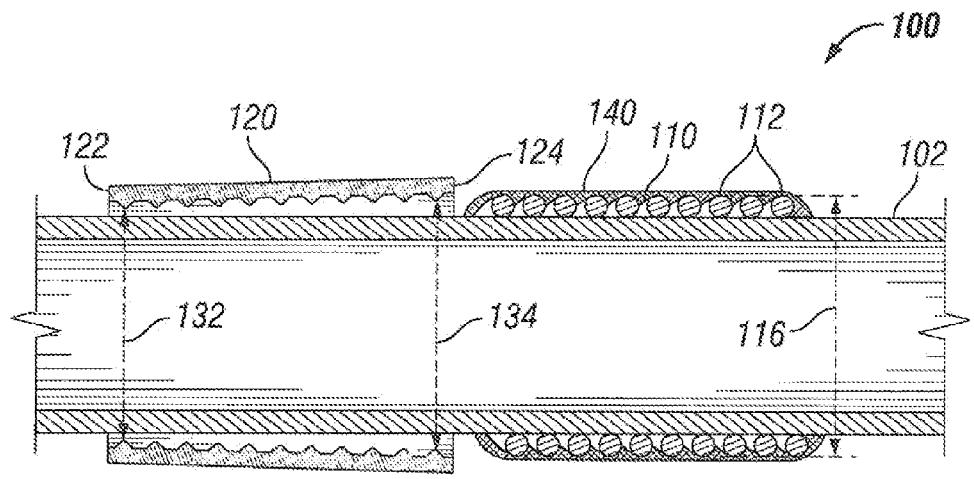
FIGS. 11 and 12 illustrate a third sequence of the sleeve being installed around the tubular and the flexible member, according to an embodiment.
Figure 12:
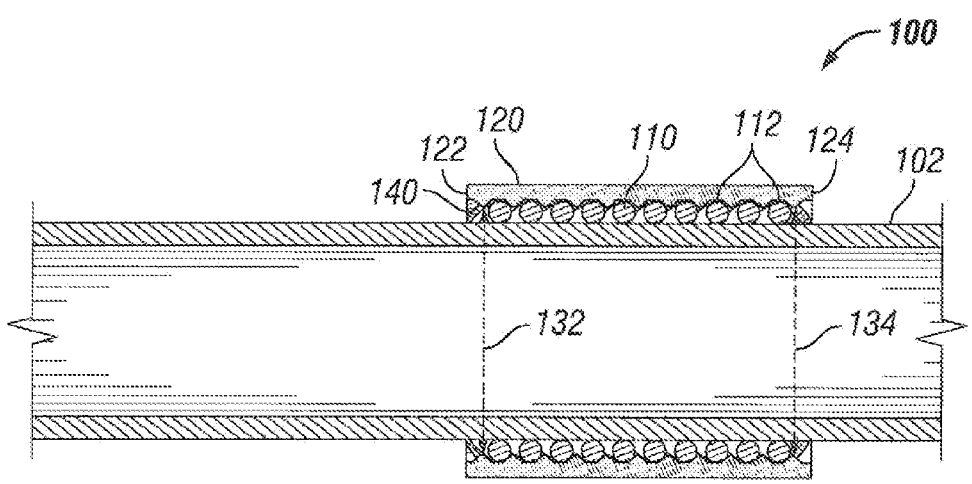

FIGS. 11 and 12 illustrate a third sequence of the sleeve 120 being installed around the tubular 102 and the flexible member 110, according to an embodiment. More particularly, FIG. 11 illustrates a side, cross-sectional view of the sleeve 120 around the tubular 102 and axially-offset from the flexible member 110, according to an embodiment. In at least one embodiment, the inner surface 128 of the sleeve 120 may be tapered such that the radially inward gripping force applied by the sleeve 120 on the flexible member 110 and the tubular 102 increases with each turn of the sleeve 120 (e.g., as the sleeve 120 moves axially to the right with respect to the flexible member 110). For example, the diameter 132 of the inner surface 128 of the sleeve 120 proximate to the first axial end 122 may be less than the diameter 134 of the inner surface 128 of the sleeve 120 proximate to the second axial end 124. As such, a line tangential to the inner surface 128 of the sleeve 120 may be oriented at an angle 136 with respect to a longitudinal axis through the sleeve 120. The angle 136 may be from about 1° to about 20°, about 2° to about 15°, or about 3° to about 10°.

FIG. 12 illustrates a side, cross-sectional view of the sleeve 120 around the tubular 102 and axially-aligned with the flexible member 110, according to an embodiment. The sleeve 120 may be moved or slid toward the flexible member 110 (e.g., to the right, as shown in FIG. 12). Upon contacting the flexible member 110, the sleeve 120 may be rotated with respect to the flexible member 110 such that the threaded inner surface 128 of the sleeve 120 engages the turns 112 of the flexible member 110. As the sleeve 120 is rotated, the first end 122 of the sleeve 120 may expand radially-outward until the diameter 132 is substantially equal to the diameter 134. This may apply an increased radially-inward gripping force on the flexible member 110 and the tubular 102.

In at least one embodiment, the flexible member 110 may receive the optional coating 140, e.g., prior to receiving the sleeve 120. In at least one embodiment, the coating 140 may be an adhesive that forms a bond between the flexible member 110 and the sleeve 120, so as to resist displacement of the sleeve 120 relative to the flexible member 110. In addition, the adhesive may reduce a friction between the sleeve 120 and the flexible member 110 when sliding the sleeve 120 over the flexible member 110 during installation. Further, the adhesive may be used to form a ramp surface similar to the ramp 130.

Although the cross-sectional profiles of the turns 112 of the flexible member 110 are shown as circular, and the corresponding cross-sectional profiles of the threads on the inner surface 128 of the sleeve 120 are shown as triangular, it will be appreciated that these shapes are merely illustrative, and other shapes are also contemplated herein. For example, the cross-sectional profile of each turn 112 of the flexible member 110 may be triangular to correspond to the profile of the threads on the inner surface 128 of the sleeve 120.

Figure 13:
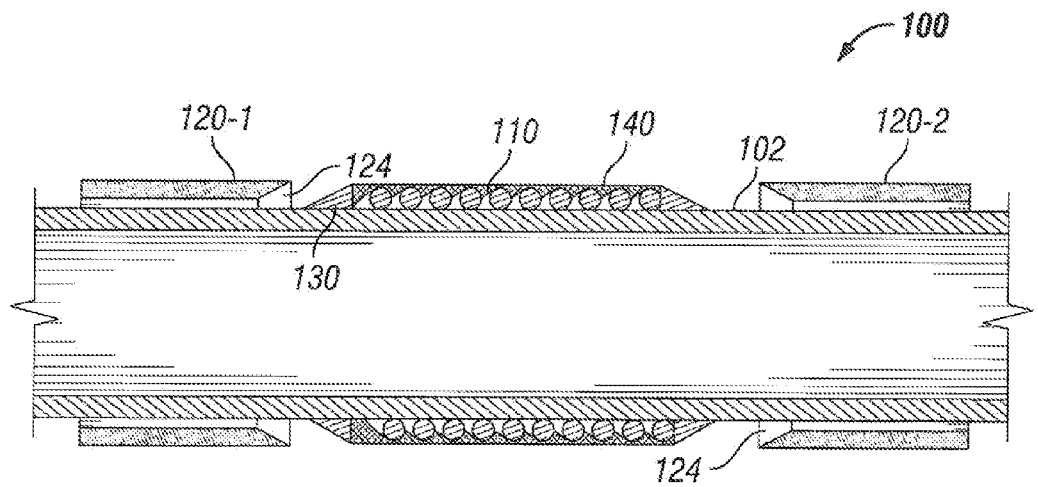
FIGS. 13 and 14 illustrate a fourth sequence of the sleeve being installed around the tubular and the flexible member, according to an embodiment.
Figure 14:
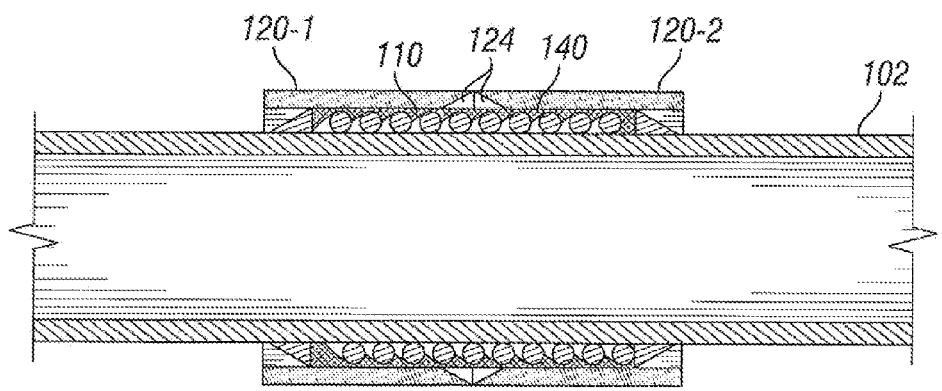

FIGS. 13 and 14 illustrate a fourth sequence of the sleeve 120 being installed around the tubular 102, according to an embodiment. More particularly, FIG. 13 illustrates a side, cross-sectional view of first and second sleeve portions 120-1, 120-2 around the tubular 102 and axially-offset from the flexible member 110, according to an embodiment. The sleeve portions 120-1, 120-2 may be positioned around the tubular 102 and on opposing sides of the flexible member 110. For example, the sleeve portions 120-1, 120-2 may be positioned around the tubular 102 by sliding the sleeve portions 120-1, 120-2 over opposing ends of the tubular 102 and toward the flexible member 110. In another embodiment, the sleeve portions 120-1, 120-2 may be moved laterally into position around the tubular 102.

FIG. 14 illustrates a side, cross-sectional view of the sleeve portions 120-1, 120-2 around the tubular 102 and axially-aligned, with the flexible member 110, according to an embodiment. The sleeve portion 120-1 may be moved or slid toward the flexible member 110 (e.g., to the right, as shown in FIG. 14). Similarly, the sleeve portion 120-2 may be moved or slid toward the flexible member 110 (e.g., to the left, as shown in FIG. 14).

Without being bound by theory, the force needed to move the sleeve 120 in FIGS. 7-12 into position around the flexible member 110 may increase as the surface area (of the inner surface) of the sleeve 120 that is in contact with the flexible member 110 increases. As such, by splitting the sleeve 120 into two or more portions 120-1, 120-2, the surface area of each sleeve portion 120-1, 120-2 is reduced, which may reduce the amount of force needed to more the sleeve portions 120-1, 120-2 into position around the flexible member 110.

As shown, the axial ends 124 of the sleeve portions 120-1, 120-2 may be tapered. The tapered axial ends 124 may allow the inner surfaces of the sleeve portions 120-1, 120-2 to ride onto the flexible member 110. As the sleeve portions 120-1, 120-2 continue to move onto the outer surface of the flexible member 110, the sleeve portions 120-1, 120-2 may be expanded radially-outwards. When positioned around the flexible member 110, the elasticity of the sleeve portions 120-1, 120-2 may cause the sleeve portions 120-1, 120-2 to apply a radially-inward force on the flexible member 110.

In at least one embodiment, the flexible member 110 may receive the coating 140 prior to receiving the sleeve portions 120-1, 120-2. In at least one embodiment, the coating 140 may be an adhesive that forms a bond between the flexible member 110 and the sleeve portions 120-1, 120-2, so as to resist displacement of the sleeve portions 120-1, 120-2 relative to the flexible member 110. In addition, the adhesive may reduce a friction between the sleeve portions 120-1, 120-2 and the flexible member 110 when sliding the sleeve portions 120-1, 120-2 over the flexible member 110 during installation.

Figure 15:
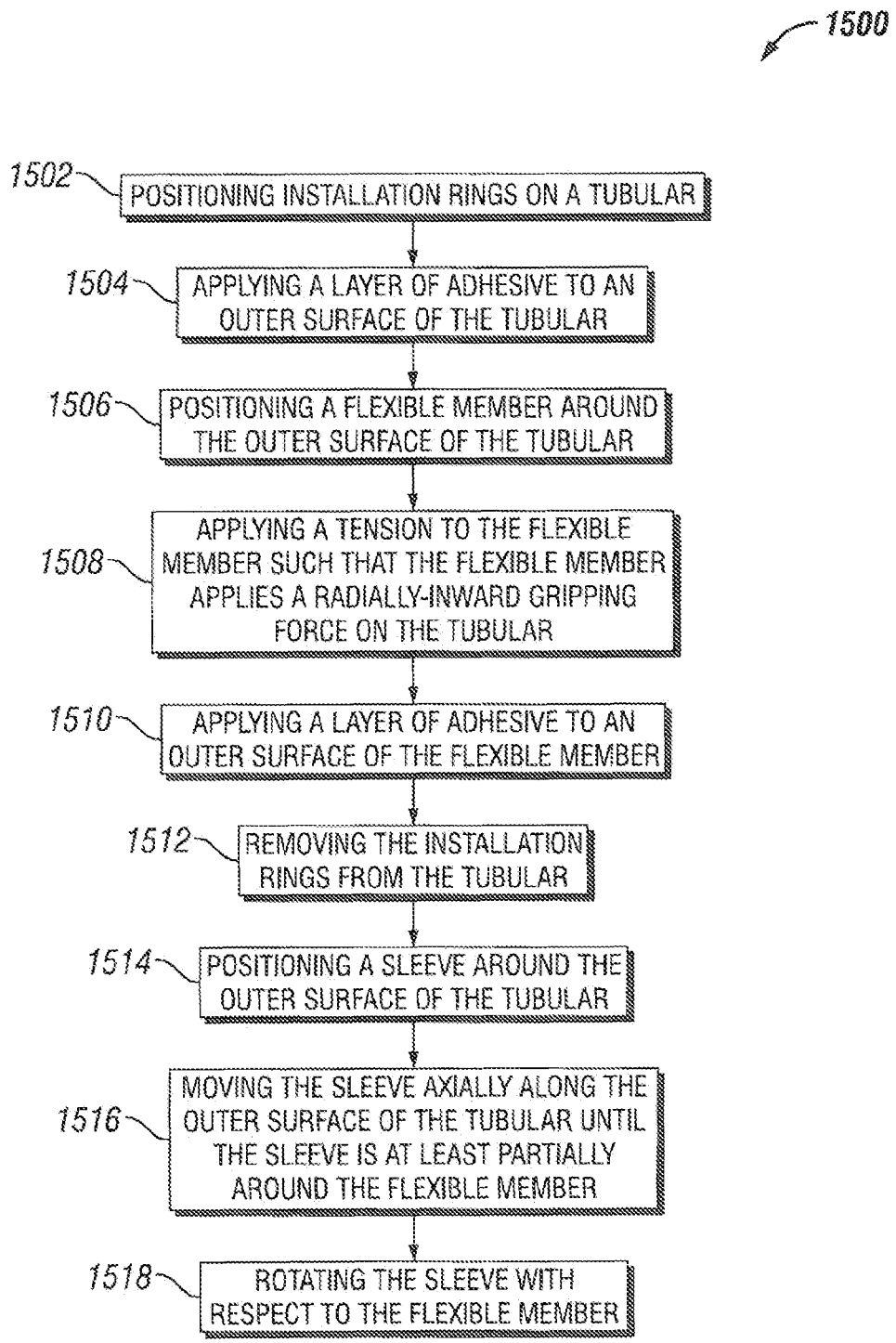
FIG. 15 illustrates a flowchart of a method for forming an attachment apparatus on a tubular, according to an embodiment.

FIG. 15 illustrates a flowchart of a method 1500 for forming an attachment apparatus on a tubular, according to an embodiment. The method 1500 may be best understood with reference to FIGS. 1-14; however, it will be appreciated that the method 1500 is not limited to any particular structure, unless otherwise specifically stated herein. The method 1500 may include positioning installation rings on a tubular, as at 1502. Positioning the installation rings may occur by sliding the installation rings over an end of the tubular, or by opening or decoupling segments of the installation rings, so as to position the installation rings around the tubular.

The method 1500 may proceed to applying a layer of adhesive to the tubular, for example, between the installation rings, as at 1504. A flexible member may then be positioned around the outer surface of the tubular, as at 1506. For example, the flexible member may be wrapped more than once around the outer surface of the tubular to form a helical configuration with a plurality of axially-adjacent turns.

The method 1500 may also include applying a tension to the flexible member such that the flexible member applies a radially-inward gripping force on the tubular, as at 1508. For example, the method 1500 may include applying the tension to the flexible member while wrapping the flexible member around the tubular, in another example, the tension may be applied to ends of a mandrel of the flexible member disposed within a sheath of the flexible member, such that the mandrel moves relative to the sheath. In another example, the flexible member may be radially-contracted.

In at least one embodiment, a layer (e.g., adhesive coating) may be applied to the outer surface of the flexible member once the flexible member is positioned around the tubular, as at 1510. The installation rings may be removed from the tubular after the flexible member is positioned around the tubular, after the tension is applied to the flexible member, and/or after the adhesive is applied to the outer surface of the flexible member, as at 1512.

A sleeve may then be positioned around the tubular, as at 1514. The sleeve may be moved or slid axially along the outer surface of the tubular until the sleeve is at least partially around (e.g., axially-aligned with and radially-outward from) the flexible member, as at 1516. In at least one embodiment, the sleeve may include a threaded inner surface, and the sleeve may be rotated with respect to the flexible member such that the threads of the sleeve engage the turns of the flexible member, as at 1518. In other words, the turns of the flexible member may serve as outer threads that engage the inner threads of the sleeve.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An apparatus, comprising:
    a flexible member extending circumferentially around a tubular more than once, wherein a tension force on the flexible member causes the flexible member to apply a first radially-inward gripping force on the tubular; and
    an annular sleeve positioned radially-outward from the flexible member, wherein the sleeve applies a second radially-inward gripping force on the flexible member and the tubular, and wherein an inner surface of the sleeve comprises a plurality of threads and the inner surface is tapered such that the second radial-inward gripping force increases with each subsequent rotation of the sleeve with respect to the flexible member, and wherein a first diameter of the inner surface of the sleeve proximate to a first axial end of the sleeve is greater than a second diameter of the inner surface of the sleeve proximate to a second axial end of the sleeve.

2. The apparatus of claim 1, wherein the flexible member forms a plurality of turns in a helical configuration, and wherein the threads of the sleeve are configured to engage the turns of the flexible member when the sleeve is rotated with respect to the flexible member.

3. The apparatus of claim 1, wherein an axial end of the sleeve is tapered to facilitate movement of the sleeve onto the flexible member.

4. The apparatus of claim 1, further comprising a ramp positioned proximate to an axial end of the flexible member to facilitate movement of the sleeve onto the flexible member.

5. The apparatus of claim 1, wherein the inner surface of the sleeve forms an interference fit with an outer surface of the flexible member, such that an elasticity of the sleeve causes the sleeve to apply a radially-inward force on the flexible member.

6. The apparatus of claim 1, further comprising an adhesive layer positioned radially-between the tubular and the flexible member.

7. An attachment apparatus for attaching to a tubular, comprising:
    a flexible member positioned circumferentially around the tubular such that the flexible member defines a plurality of turns in a helical configuration around the tubular, wherein a tension force on the flexible member causes the flexible member to apply a first radially-inward gripping force on the tubular; and
    an annular sleeve positioned radially-outward from the flexible member and the sleeve covers substantially the entire length of the flexible member, wherein the sleeve applies a second radially-inward gripping force on the flexible member and the tubular, wherein an inner surface of the sleeve comprises a plurality of threads and the inner surface is tapered such that the second radial-inward gripping force increases with each subsequent rotation of the sleeve with respect to the flexible member, and wherein a first diameter of the inner surface of the sleeve proximate to a first axial end of the sleeve is greater than a second diameter of the inner surface of the sleeve proximate to a second axial end of the sleeve.

8. The apparatus of claim 7, further comprising a coating applied to an outer surface of the flexible member prior to the placement of the annular sleeve, wherein the coating is configured to reduce the friction between the annular sleeve and the flexible member when sliding the annular sleeve over the flexible member.

9. The apparatus of claim 7, further comprising a coating applied to an outer surface of the flexible member prior to the placement of the annular sleeve, wherein the coating is configured to provide a ramp surface to facilitate the placement of the annular sleeve over the flexible member.

10. A method for forming an attachment apparatus on a tubular, comprising:
    positioning a flexible member around an outer surface of the tubular, wherein the flexible member comprises a plurality of turns in a helical configuration;
    causing a tension force to be applied to the flexible member, wherein the tension force causes the flexible member to apply a first radially-inward gripping force on the tubular;
    placing a coating on an outer surface of the flexible member;
    positioning an annular sleeve around the outer surface of the tubular; and
    moving the sleeve axially with respect to the tubular until the sleeve is at least partially around the flexible member, wherein the sleeve applies a second radially-inward gripping force on the flexible member and the tubular, wherein an inner surface of the sleeve comprises a plurality of threads and the inner surface is tapered such that the second radial-inward gripping force increases with each subsequent rotation of the sleeve with respect to the flexible member, and wherein a first diameter of the inner surface of the sleeve proximate to a first axial end of the sleeve is greater than a second diameter of the inner surface of the sleeve proximate to a second axial end of the sleeve.

11. The method of claim 10, further comprising applying an adhesive layer to the outer surface of the tubular prior to positioning the flexible member around the outer surface of the tubular.

12. The method of claim 10, wherein positioning the flexible member around the outer surface of the tubular comprises wrapping the flexible member around the outer surface of the tubular.

13. The method of claim 10, further comprising rotating the sleeve with respect to the flexible member.

14. The method of claim 10, wherein an inner surface of the sleeve forms an interference fit with an outer surface of the flexible member.

15. The method of claim 10, wherein the coating is configured to reduce the friction between the annular sleeve and the flexible member when moving the annular sleeve with respect to the tubular.

16. The method of claim 10, wherein the coating is configured to provide a ramp surface to facilitate the placement of the annular sleeve over the flexible member.

* * * * *